United States Patent
Sachet et al.

(10) Patent No.: US 10,877,658 B2
(45) Date of Patent: Dec. 29, 2020

(54) TECHNIQUE FOR INPUTTING AT LEAST ONE CHARACTER BY WAY OF A USER INTERFACE OF AN ELECTRONIC DEVICE

(71) Applicant: Orange, Paris (FR)

(72) Inventors: Patrick Sachet, Chatillon (FR); Franck Weens, Chatillon (FR); Remi Lavedrine, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/410,454

(22) Filed: May 13, 2019

(65) Prior Publication Data

US 2019/0361583 A1 Nov. 28, 2019

(30) Foreign Application Priority Data

May 22, 2018 (FR) ..................................... 18 54257

(51) Int. Cl.
*G06F 3/0485* (2013.01)
*G06F 3/0482* (2013.01)
(Continued)

(52) U.S. Cl.
CPC .......... *G06F 3/0485* (2013.01); *G06F 3/0482* (2013.01); *G06F 3/0489* (2013.01); *G06F 3/04883* (2013.01)

(58) Field of Classification Search
CPC .. G06F 3/0485; G06F 3/04883; G06F 3/0489; G06F 3/0482
See application file for complete search history.

(56) References Cited

U.S. PATENT DOCUMENTS

2007/0245259 A1* 10/2007 Carlson ................. G06F 3/0236
                                                                 715/773
2014/0282211 A1* 9/2014 Ady ....................... G06F 3/0484
                                                                 715/780
(Continued)

FOREIGN PATENT DOCUMENTS

FR          3023021 A1    6/2014
WO       2015197936 A1    12/2015

OTHER PUBLICATIONS

French Search Report and Written Opinion dated Feb. 5, 2019 for corresponding French Application No. 1854257, filed May 22, 2018.

(Continued)

*Primary Examiner* — Anil K Bhargava
(74) *Attorney, Agent, or Firm* — David D. Brush; Westman, Champlin & Koehler, P.A.

(57) ABSTRACT

A method and apparatus for inputting at least one character by way of a user interface of an electronic device. The method includes: detecting a scrolling command performed by way of a command input element; displaying a current character in a display area by scrolling through a current set of characters, triggered by the detection of the scrolling command; detecting a selection of the current character; determining a new restricted set of characters on the basis of the current set of characters, the new set including the selected character and a selection of characters surrounding the selected character and becoming the current set of characters for a following iteration of the display of the scrolling of characters; and detecting a confirmation of the current character by way of the command input element, putting an end to the iterations.

8 Claims, 1 Drawing Sheet

(51) Int. Cl.
  *G06F 3/0488* (2013.01)
  *G06F 3/0489* (2013.01)

(56) References Cited

U.S. PATENT DOCUMENTS

2017/0131787 A1* 5/2017 Guignon ................. G06F 1/163
2017/0308255 A1* 10/2017 Bhupati ................ G06F 3/0485

OTHER PUBLICATIONS

English translation of the French Written Opinion dated Feb. 5, 2019 for corresponding French Application No. 1854257, filed May 22, 2018.

* cited by examiner

TECHNIQUE FOR INPUTTING AT LEAST ONE CHARACTER BY WAY OF A USER INTERFACE OF AN ELECTRONIC DEVICE

CROSS-REFERENCE TO RELATED APPLICATIONS

This Application claims priority to and the benefit of French Patent Application No. FR 1854257, filed May 22, 2018, the content of which is incorporated herein by reference in its entirety.

FIELD OF THE DISCLOSURE

The invention belongs to the field of user interfaces and relates more particularly to a method for inputting at least one character by way of a user interface of an electronic device.

BACKGROUND OF THE DISCLOSURE

The miniaturization of electronic devices and in particular of wireless communication devices nowadays allows the development of numerous objects called "connected objects". These are often conventional objects to which communication capabilities are added. They may be for example a home automation sensor (temperature sensor, passage detector, pressure sensor, etc.), a flowerpot capable of informing the user when it is necessary to carry out watering, a bracelet for receiving messages or else a watch on which it is possible to take telephone calls. Although it is nowadays possible to miniaturize the electronic circuits of such objects, the means for interacting with users are not able to be miniaturized in the same way. For example, a home automation sensor may require interaction means such that a user is able to configure an association with a terminal by inputting for example a code for accessing a wireless network. To this end, interaction means that have at least certain ergonomics are necessary, such as for example a screen accompanied by an input device. Due to the small size of some equipment, the bulk of these interaction means must sometimes be kept as low as possible. For example, a home automation sensor may include a screen of suitable size capable of displaying a few characters and a single button allowing information to be input.

Patent publication WO2015/197936 describes a technique for inputting at least one alphanumeric character on an electronic device by way of a user interface of an electronic device. This user interface comprises a display screen with at least a first area for displaying at least one input alphanumeric character, and a second area for displaying an alphanumeric character currently being input. The electronic device also comprises a command input element for entering at least one scrolling command to be applied to an alphanumeric character displayed in the second display area. The electronic device detects a scrolling command input performed by way of the command input element, this command triggering displaying of a character in the second display area. The electronic device then replaces the character displayed previously with a new character. The user is then able to command inputting of the current character or else command displaying of a following character.

Inputting a text message formed of characters may thus seem tedious for the user, said user having to interact with the electronic device in order to scroll through each character one by one until the sought character appears.

There is therefore a need for a solution for inputting characters that is applicable to electronic devices having interaction means that are reduced to a minimum, which solution is easy to implement, faster and therefore makes it possible to increase the lifetime of a battery of the electronic device.

SUMMARY

One of the aims of an exemplary embodiment of the invention is to rectify inadequacies/drawbacks of the prior art and/or to make improvements thereto.

According to a first aspect, what is proposed is a method for inputting at least one character by way of a user interface of an electronic device. The user interface comprises a command input element and a display screen with at least a first area for displaying a character currently being input. The method comprises:
  detecting a scrolling command performed by way of the command input element,
  displaying a current character in the first display area by scrolling through a current set of characters, said display being triggered by the detection of the scrolling command,
  detecting a selection of the current character by way of the command input element,
  determining a new restricted set of characters on the basis of the current set of characters, the new set comprising the selected character and a selection of characters surrounding the selected character and becoming the current set of characters for a following iteration of the display of the scrolling of characters,
detecting a confirmation of the current character by way of the command input element, putting an end to the iterations.

The proposed technique allows quick and easy inputting of a sequence of characters by way of a screen displaying the input characters and the characters currently being input and of a command input element such as a pushbutton, or else a predefined area of a touchscreen.

Such a technique facilitates inputting of a text message for a user. As the iterations progress, the scrolling set of characters becomes smaller and smaller, thus allowing the user to select the desired character.

In addition, such a technique makes it possible to reduce the power consumption of the electronic device, as the number of interactions performed on the command input element is reduced. The proposed technique thus allows greater usage autonomy of the electronic device.

In one particular embodiment, the input method furthermore comprises displaying the confirmed character in a second display area and deleting the confirmed character from the first display area.

The electronic device thus allows the user to easily track his actions.

In one particular embodiment of the input method, the scrolling speed of the characters in the first display area during a new iteration is strictly slower than that of a previous iteration.

Thus, as the iterations progress, the display duration of a character currently being scrolled in the first display area increases, thus allowing the user to interact more effectively with the electronic device.

According to one particular feature of the input method, during an iteration, the scrolling duration of the set of characters is constant.

This duration may take for example the value of ten seconds.

In one particular embodiment of the input method, the command triggering the scrolling of characters in the first display area is detected following a short press on the command input element.

In such an embodiment, the command input element is for example a pushbutton or a predetermined area of the display interface when said display interface consists of a touchscreen.

The interaction of the user with the command input element is thus very simple.

In one particular embodiment of the input method, upon detection of a long press on the command input element, the scrolling speed of the characters in the first display area is increased.

As the duration of the interaction on the command input element for speeding up the scrolling speed of the characters is longer than the duration of the interaction for triggering the scrolling of the characters, the electronic device is able to discriminate between a request to speed up the scrolling from another interaction, such as a scrolling command. Moreover, the interaction of the user with the command input element remains very simple.

According to a second aspect, what is proposed is an electronic device for inputting at least one character by way of a user interface. This device comprises:
- a user interface comprising a command input element and a display screen with at least a first area for displaying a character currently being input;
- a detection module, designed to detect a scrolling command performed by way of the command input element, to detect a selection of the current character by way of the command input element and to detect a confirmation of the current character by way of the command input element, putting an end to the iterations;
- a display command module, designed to command displaying of a current character in the first display area by scrolling through a current set of characters, said display being triggered by the detection of the scrolling command;
- a determination module, designed to determine a new restricted set of characters on the basis of the current set of characters, the new set comprising the selected character and a selection of characters surrounding the selected character and becoming the current set of characters for a following iteration of the display of the scrolling of characters.

Such a device is for example a home automation sensor comprising a screen and a pushbutton or else a touchscreen for inputting characters.

The advantages outlined for the method for inputting at least one character according to the first aspect are able to be transposed directly to the electronic device.

This electronic device may of course include, in structural terms, the various features relating to the method for inputting at least one character such as described above, which features may be combined or taken individually.

According to a third aspect, what is also proposed is a program for an electronic device, comprising program code instructions intended to command the execution of the steps of the method for inputting at least one character according to the first aspect that are implemented by the electronic device when this program is executed by this device.

According to a fourth aspect, what is proposed is a recording medium able to be read by an electronic device and on which the program according to the third aspect is recorded.

BRIEF DESCRIPTION OF THE DRAWINGS

Other features and advantages will become apparent on reading embodiments described with reference to the drawings, in which.

DETAILED DESCRIPTION OF ILLUSTRATIVE EMBODIMENTS

Figure 1A:
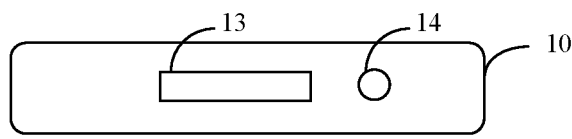
FIG. 1*a* shows an electronic device in one particular embodiment.

FIG. 1*a* shows an electronic device 10. This electronic device is for example a connected bracelet, a home automation sensor, etc. The electronic device 10 comprises a user interface such as a screen 13, such as an LCD screen or liquid-crystal display device, and a command input element 14. This command input element is for example a pushbutton 14. In another particular embodiment, the electronic device comprises a user interface such as a touchscreen 13. In this embodiment, the command input element 14 is a dedicated area of the touchscreen 13.

The electronic device 10 comprises means for connecting to a communication network, such as a radio transceiver operating in accordance with Wi-Fi (Wireless Fidelity) technology, as defined by working group 802.11 of the IEEE (Institute of Electrical and Electronics Engineers), or else means for connecting to another electronic device, such as a mobile telephone or a digital tablet, which is itself connected to a communication network. Such means for connecting to another electronic device are for example a Bluetooth® transceiver. In another embodiment, the electronic device 10 comprises means for connecting to a communication network, such as a radio transceiver operating in accordance with 3G or 4G technology.

The command input element 14 allows two types of interaction with the user interface: a short press and a long press, which are distinguished from one another by the duration for which a pressure is applied to the command input element 14. In one particular embodiment, several types of long press are distinguished from one another by increasing the duration of pressure on the command input element. These types of interaction may also be distinguished by the number of presses. Depending on the nature of the interaction, short or long press, single or multiple (double, triple, etc.) press, a certain type of action is executed by the electronic device 10 and displayed by way of the user interface 13.

Figure 1B:
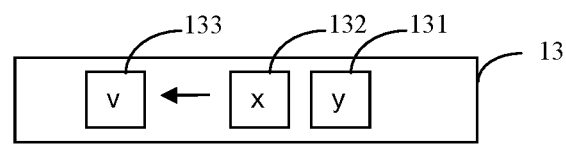
FIG. 1*b* shows the user interface of the electronic device when inputting a text message by way of a command input element in one particular embodiment.

FIG. 1*b* shows the user interface 13 when inputting a text message by way of the command input element 14. A text message is formed of one or more characters. A text message corresponds for example to an SMS (Short Message Service) short message, or else to a code for pairing with another electronic device.

The screen 13 comprises a first area 131 for displaying a character currently being input and at least one second area 132, 133 for displaying at least one input character.

The characters currently being input scroll in the display area 131 following an action performed on the pushbutton 14. The characters that are displayed belong to a set of characters S. In one particular embodiment, the scrolling of the alphanumeric characters of the set is vertical, from the upper part of the user interface 13 to the lower part, starting with the first letter of the set of characters. Once the set of characters S has been displayed, the display returns to the first character of the set. Other modes for scrolling through the alphanumeric characters in the display area 131 are possible, such as horizontal scrolling, from right to left.

Once a character has been input, that is to say confirmed following an interaction from the user, it is deleted from the display area 131 so as to be displayed in the adjacent display area 132. The character input previously is, for its part, deleted from the display area 132 so as to be displayed in the adjacent display area 133, and so on.

Figure 2:
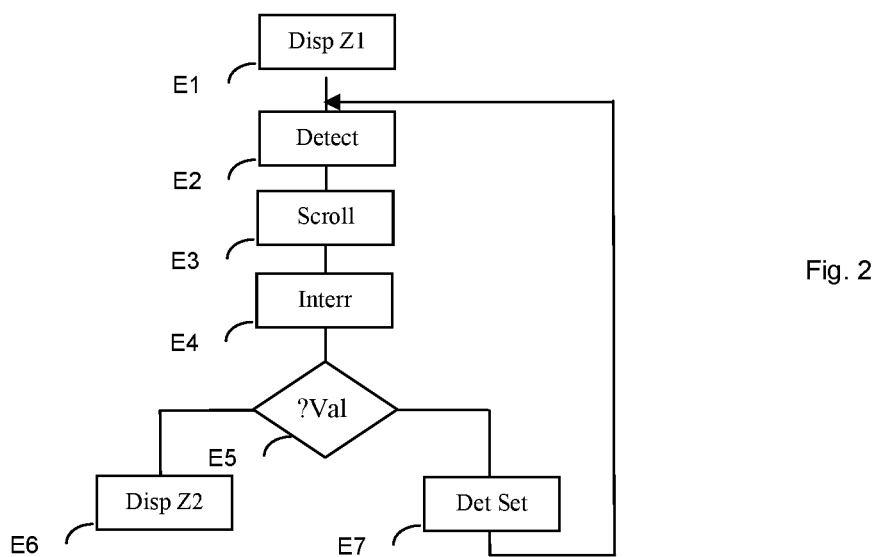
FIG. 2 shows steps of a method for inputting a text message in one particular embodiment.

FIG. 2 shows steps of a method for inputting a text message implemented by the electronic device 10.

On initialization, a set S of characters is formed with all of the alphabetical characters {a, ... z} in lower case and in upper case, numerical characters {0 ... 9} and special characters, such as mathematical symbols and punctuation marks. In some particular embodiments, this set S of characters comprises just some of the characters listed above. The set S of characters may for example correspond to all of the alphanumeric characters. This set of characters is thus tailored according to the type of electronic device.

This set of characters is the set of characters called current set of characters.

In a step E1, a first character of the current set of characters S is displayed in the display area 131.

In a step E2, the user of the electronic device 10 performs an interaction with the command input element 14, for example a short press on the pushbutton 14. The electronic device 10 detects the interaction by way of the command input element 14 and determines whether this is a scrolling command performed by way of the command input element.

In a step E3, following the detection of the scrolling command, the electronic device 10 triggers continuous scrolling of the characters of the current set of characters S in the display area 131. The characters scroll according to an order of the characters in this current set of characters. For example, the alphabetical characters are displayed in alphabetical order: a then b then c, etc. The current set of characters scrolls one by one in the display area 131. Once this set of characters has been run through, the display returns to the first character of the set.

In a step E4, the user of the electronic device 10 performs an interaction with the command input element 14. The electronic device 10 detects the interaction by way of the command input element 14 and determines whether this is a scrolling stop command performed by way of the command input element. A command to stop the scrolling corresponds for example to a short press on the pushbutton 14. The electronic device 10 triggers an interruption of the scrolling in the display area 131.

In a step E5, the electronic device 10 determines whether this is a selection of the current character, performed by the user by way of the command input element. Once the scrolling has been interrupted, in one particular embodiment, the selected character flashes in the display area 131. A delay T is then triggered. Expiry of this delay T without detection of an interaction with the user by the electronic device 10 corresponds to a selection of the displayed current character. It is possible to choose for example the value of two seconds for this delay T.

When the interaction of the user corresponds to a selection, in a step E7, the electronic device 10 determines a new current set of characters. This new set of characters corresponds to a subset of the current set of characters of the current iteration. This new restricted set of characters is determined on the basis of the current set of characters and comprises the selected character and a selection of characters surrounding the selected character. This new set becomes the current set of characters for a following iteration of the display of the scrolling of characters.

By way of illustration, when the current set of characters corresponds to all of the alphabetical characters in lower case {a, b, c, ... x, y, z} and the character displayed in the display area 131 is the letter k, the new current set is formed of n1 letters in alphabetical order preceding the letter k, of the letter k itself and of n2 letters in alphabetical order following the letter k. The new set of characters thus corresponds to {e, f, g, h, i, j, l, l, m, n, o, p} for n1=6 and n2=5. The new current set of characters is thus formed from a number N of characters surrounding the selected character k. When the number N is odd, the selected character k is situated in the middle of the current set of characters.

At the end of this step E7, the electronic device 10 again implements step E2 of scrolling through the characters of the current set of characters. In one particular embodiment, the display in the display area 131 begins for example with the character selected in the previous iteration. In another particular embodiment, the display in the display area 131 begins for example with the first character of the new set of characters. There is no limit associated with the manner of selection of the starting character that is displayed in the scrolling step E2.

When, in step E5, the electronic device 10 determines that this is not a selection of the current character, this is a confirmation of the current character of the set of characters of this iteration. This confirmation takes place before the expiry of the delay T and is detected on the basis of an interaction of the user by way of the command input element. In one particular embodiment, the detection of a double press on the command input element 14 by the electronic device 10 indicates confirmation, by the user, of the character displayed in the display area 131. In another particular embodiment, the detection of a long press on the command input element 14 by the electronic device 10 indicates confirmation, by the user, of the character displayed in the display area 131.

When the interaction of the user corresponds to a confirmation, in a step E6, the character currently being displayed in the display area 131 is considered to be input, that is to say confirmed. The electronic device 10 deletes the display of the input character from the display area 131 and triggers displaying thereof in the adjacent display area 132. This detection of a confirmation of the current character by way of the command input element 14 puts an end to the iterations.

It is understood that these steps are thus executed by the electronic device 10 until confirmation of a character, and then implemented again in order to input the following character. The embodiment has been described with two iterations. There is no limit attached to the number of iterations, this depending on the confirmation of a character by the user.

To finish, in an input end step (not shown in FIG. 2), the electronic device 10 detects an interaction by way of the command input element 14, for example a long press, this interaction of the user with the command input element 14 allowing him to indicate the end of the inputting of the text message. The inputting of the text message is then ended. The text message may for example be transmitted to another electronic device in order to perform pairing, when it corresponds to a pairing key. The text message may also be transmitted to another electronic device when it corresponds to an SMS short message.

In the embodiment described, the scrolling speed v of a set of characters does not vary.

In another embodiment, the scrolling speed decreases as the iterations progress. In step E7, the electronic device 10 determines the scrolling speed to be applied to the following iteration. The scrolling speed of the characters in the first display area during a new iteration is chosen so as to be strictly slower than that applied during a previous iteration. By way of illustration, during the first iteration, the scrolling speed is fast, for example of the order of four characters per second. During the second iteration, the scrolling speed is slower, for example of the order of two characters per second. A slower scrolling speed during a second iteration thus allows the user to refine the selection of the input character.

The scrolling speed depends for example on the number of characters of the set of characters. Thus, during an iteration, the duration of the scrolling of the set of characters is constant, regardless of the cardinal number of this set of characters. As the cardinal number of the sets of characters reduces upon each iteration, the characters will remain displayed in the display area 131 for a longer time as the iterations progress.

In one particular embodiment, an interaction of the user by way of the command input element 14 detected by the electronic device 10 makes it possible to increase the scrolling speed of the characters in the display area 131 in step E2. A long press on the command input element makes it possible for example to increase the scrolling speed of the characters in the display area 131.

In one particular embodiment, an interaction of the user by way of the command input element 14 detected by the electronic device 10 makes it possible to delete the last character selected in step E5. By way of illustration, this interaction corresponds to a triple short press on the command input element. Upon detection of this interaction by the electronic device, the previous iteration of the input method is implemented again on the basis of the current set of characters used during the previous iteration. The selected character is thus again the one from this previous iteration. When this is the first iteration, the current set of characters corresponds to the initial current set of characters (step E1).

The embodiments have been described with a display order of the characters, for example in alphabetical order. More generally, the display order corresponds to the order of the characters in the set of characters. There is no limit attached to this display order. An interaction of the user by way of the command input element detected by the electronic device 10 may for example make it possible to reverse this display order. The last character of the set of characters is then displayed first, followed by the penultimate one, and so on until the first character of the set of characters.

The embodiments have been described with certain types of interaction of the user by way of the command input element, such as short presses, double presses and long presses. There is no limit attached to these types of interaction. The proposed input technique is thus able to be transposed to other types of interaction and other interaction layouts, making it possible to restrict, over successive iterations, a set of characters to be displayed on the basis of detections of interruption of the display by a user allowing him to select or to confirm a character.

Figure 3:
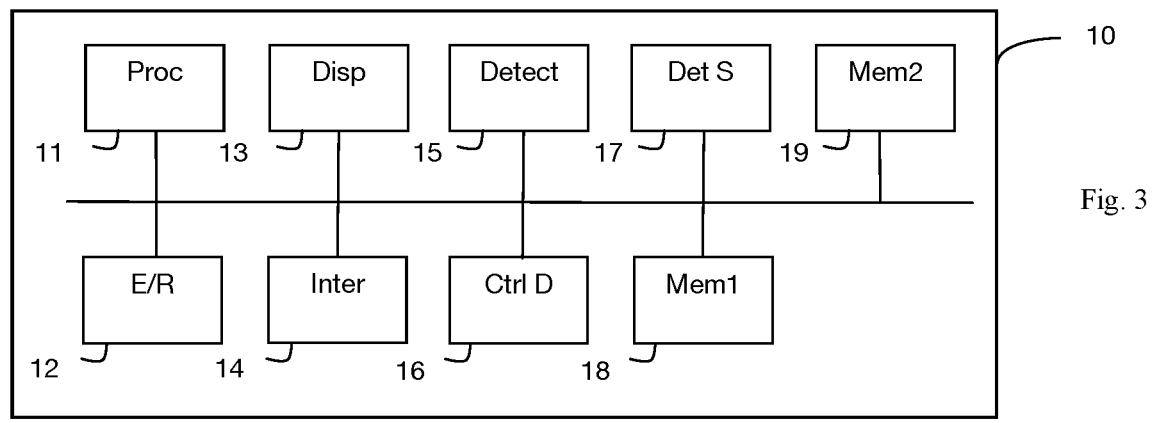
FIG. 3 shows the electronic device in one particular embodiment.

FIG. 3 shows the electronic device 10 and the various modules of which it consists.

The electronic device 10 comprises in particular:
a processor 11 for executing code instructions of software modules;
a communication module 12, forming a communication interface with a wireless communication network, designed to communicate with another device;
a memory area 18, designed to store a program that comprises code instructions for implementing the steps of the input method;
a storage memory 19, designed to store data used in the implementation of the input method;
a user interface comprising a screen 13 and a command input element 14;
a detection module 15, designed to detect an interaction of the user with the command input element 14;
a display command module 16, designed to command a display on the screen 13;
a determination module 17, designed to determine a new restricted set of characters on the basis of the current set of characters, the new set comprising the selected character and a selection of characters surrounding the selected character and becoming the current set of characters for a following iteration of the display of the scrolling of characters.

The detection module 15 is in particular designed to detect a scrolling command performed by way of the command input element, to detect a selection of the current character by way of the command input element and to detect a confirmation of the current character by way of the command input element, putting an end to the iterations. In one particular embodiment, the detection module 15 is designed to measure a duration of interaction of a user with the command input element 14, thus making it possible to differentiate between short interactions and long interactions.

The display command module 16 is designed in particular to command displaying of a current character in the first display area 131 by scrolling through a current set of characters, said display being triggered by the detection of the scrolling command.

In one particular embodiment, the command input element 14 is a pushbutton. In another particular embodiment, the display 13 is a touchscreen. In this embodiment, the command input element 14 is a dedicated area of the touchscreen 13.

In one particular embodiment, the display command module 16 is designed in particular to command the display of the confirmed character in a second display area 132 and deletion of the confirmed character from the first display area 131, upon detection by the detection module 15 of confirmation of the current character by way of the command input element.

In one particular embodiment, the determination module 17 is also designed to determine a scrolling speed to be applied during the following iteration. This scrolling speed of the characters in the first display area during a new iteration is strictly slower than that applied during a previous iteration. In one particular embodiment, the determination module 17 is designed to determine said speed in such a way as to keep the duration of the scrolling of a set of characters constant.

In one particular embodiment, the command triggering the scrolling of characters in the first display area is detected by the detection module 15 following a short press on the command input element 14.

In one particular embodiment, the detection module 15 is designed to detect a long press on the command input element 14 during scrolling and to increase the scrolling speed of the characters in the first display area following this detection.

It is emphasized at this point that the electronic device 10 also comprises other processing modules, not shown in FIG. 3, that are designed to implement the various functions of this device.

The technique for inputting at least one character is implemented by way of software components and/or hardware components. In this regard, the term "module" may correspond in this document equally to a software component, to a hardware component or to a set of hardware and/or software components, able to implement a function or a set of functions, according to what is described above in respect of the module in question.

A software component corresponds to one or more computer programs, one or more subroutines of a program, or more generally to any element of a program or of software. Such a software component is stored in memory and then loaded and executed by a data processor of a physical entity, and is able to access the hardware resources of this physical entity (memories, recording media, communication buses, electronic input/output cards, user interfaces, etc.).

In the same way, a hardware component corresponds to any element of a hardware assembly. It may be a programmable or non-programmable hardware component, with or without an integrated processor for executing software. It is for example an integrated circuit, a chip card, an electronic card for executing firmware, etc.

In one particular embodiment, the modules 15, 16, 17 are designed to implement the steps of the method for inputting at least one character described above that are implemented by the electronic device. These are preferably software modules comprising software instructions for executing the steps (or the actions) of the input method described above that are implemented by an electronic device. An embodiment of the invention therefore also relates to:

- a program for an electronic device, comprising program code instructions intended to command the execution of the steps (or the actions) of the input method described above when said program is executed by this device;
- a recording medium able to be read by a device and on which the program for a device is recorded.

The information medium may be any entity or device capable of storing the program. For example, the medium may include a storage means, such as a ROM (for "Read Only Memory"), for example a CD-ROM or a microelectronic circuit ROM, or else a magnetic recording means, for example a hard disk.

Moreover, the information medium may be a transmissible medium such as an electrical or optical signal, which may be routed via an electrical or optical cable, by radio or by other means. The program according to an embodiment of the invention may in particular be downloaded from an Internet network.

As an alternative, the information medium may be an integrated circuit in which the program is incorporated, the circuit being designed to execute or to be used in the execution of the method in question.

Each of the computer programs described above may use any programming language, and be in the form of source code, object code, or of intermediate code between source code and object code, such as in a partially compiled form, or in any other desirable form.

Although the present disclosure has been described with reference to one or more examples, workers skilled in the art will recognize that changes may be made in form and detail without departing from the scope of the disclosure and/or the appended claims.

The invention claimed is:

1. A method comprising:
inputting at least one character by using a user interface of an electronic device, the user interface comprising a command input element and a display screen with at least a first area for displaying a character currently being input, the inputting including acts comprising:
detecting a scrolling command performed by way of the command input element,
displaying a current character in the first display area by continuously scrolling one by one through a current set of characters, said display being triggered by the detection of the scrolling command,
detecting a selection of the current character by way of the command input element,
determining a new restricted set of characters on the basis of the current set of characters, the new restricted set comprising the selected character and a selection of characters surrounding the selected character in the current set of characters and becoming the current set of characters for a following iteration of the display of the scrolling of characters, and
iteratively repeating at least the acts of displaying a current character by continuously scrolling the new restricted set of characters and detecting a selection of the current character until detecting a confirmation of the current character by way of the command input element, putting an end to the act of iteratively repeating.

2. The method according to claim 1, comprising displaying the confirmed character in a second display area and deleting the confirmed character from the first display area.

3. The method according to claim 1, wherein a scrolling speed of the characters in the first display area during a new iteration is strictly slower than that of a previous iteration.

4. The method according to claim 3, wherein, during an iteration, a scrolling duration of the set of characters is constant.

5. The method according to claim 1, wherein the scrolling command triggering the scrolling of characters in the first display area is detected following a short press on the command input element.

6. The method according to claim 1, wherein, upon detection of a long press on the command input element, a scrolling speed of the characters in the first display area is increased.

7. An electronic device for inputting at least one character by way of a user interface, comprising:
said user interface comprising a command input element and a display screen with at least a first area for displaying a character currently being input; and
a processor configured to:
detect a scrolling command performed by way of the command input element;
command displaying of a current character in the first display area by continuously scrolling one by one through a current set of characters, said display being triggered by the detection of the scrolling command;
detect a selection of the current character by way of the command input element,
determine a new restricted set of characters on the basis of the current set of characters, the new restricted set comprising the selected character and a selection of characters surrounding the selected character in the current set of characters and becoming the current set of characters for a following iteration of the display of the scrolling of characters; and iteratively repeat at least the displaying of a current character by continuously scrolling the new restricted set of characters and the detecting of a selection of the current character until detecting a confirmation of the current character by way of the command input element, putting an end to the iteratively repeating.

8. A non-transitory computer-readable medium comprising program code instructions stored thereon, which when executed by a processor of an electronic device, command execution of a method of inputting at least one character by way of a user interface of the electronic device, the user interface comprising a command input element and a display screen with at least a first area for displaying a character currently being input, wherein the instructions configure the electronic device to:

detect a scrolling command performed by way of the command input element, display a current character in the first display area by continuously scrolling one by one through a current set of characters, said display being triggered by the detection of the scrolling command, detect a selection of the current character by way of the command input element, determine a new restricted set of characters on the basis of the current set of characters, the new restricted set comprising the selected character and a selection of characters surrounding the selected character in the current set of characters and becoming the current set of characters for a following iteration of the display of the scrolling of characters, and iteratively repeat at least the acts of displaying a current character by continuously scrolling the new restricted set of characters and detecting a selection of the current character until detecting a confirmation of the current character by way of the command input element, putting an end to the iteratively repeating.

* * * * *